April 15, 1930.  A. V. BODINE  1,754,454
PHONOGRAPH STOP
Original Filed May 1, 1926   5 Sheets-Sheet 2
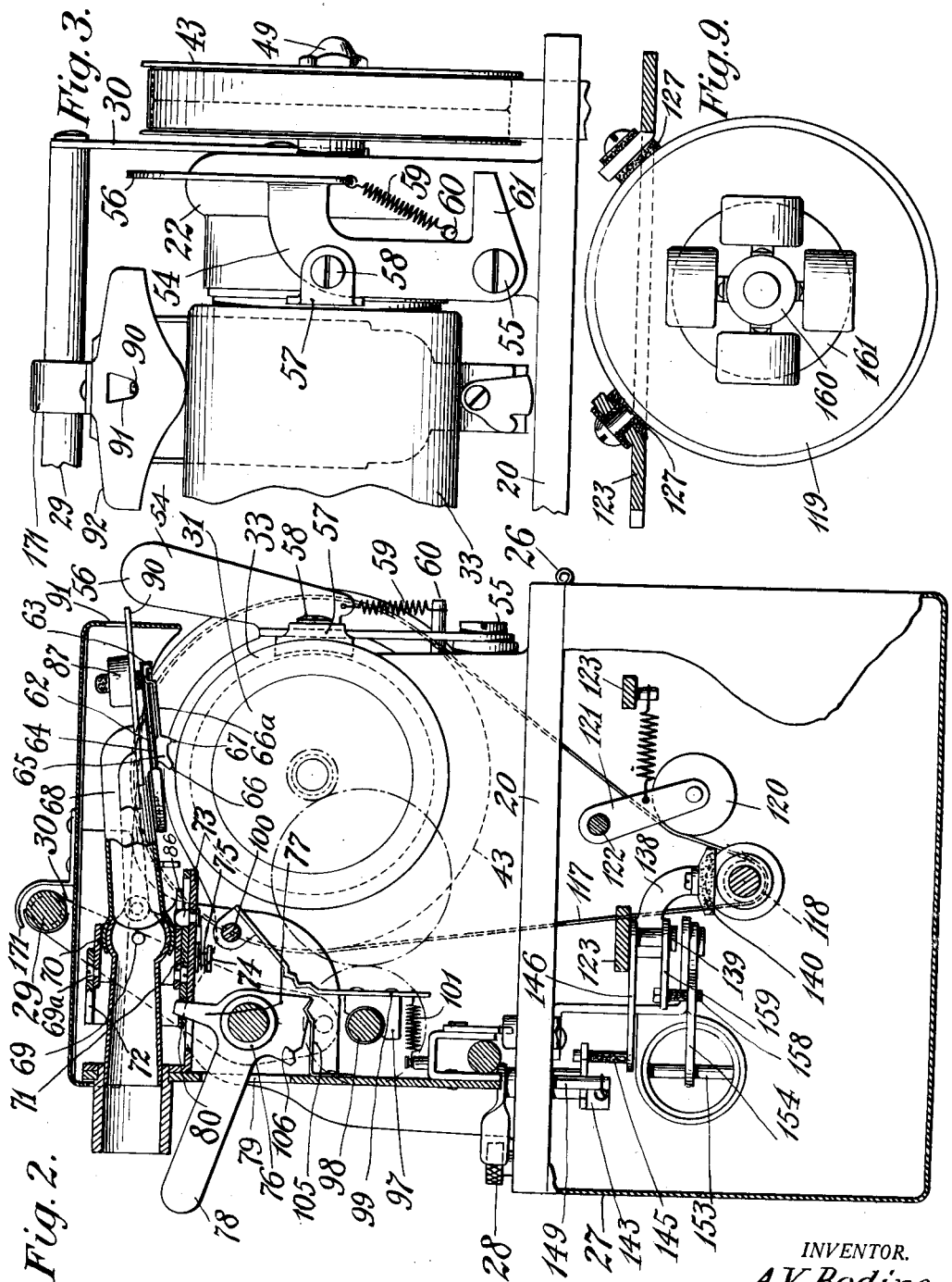
INVENTOR.
A. V. Bodine,
BY
ATTORNEY.

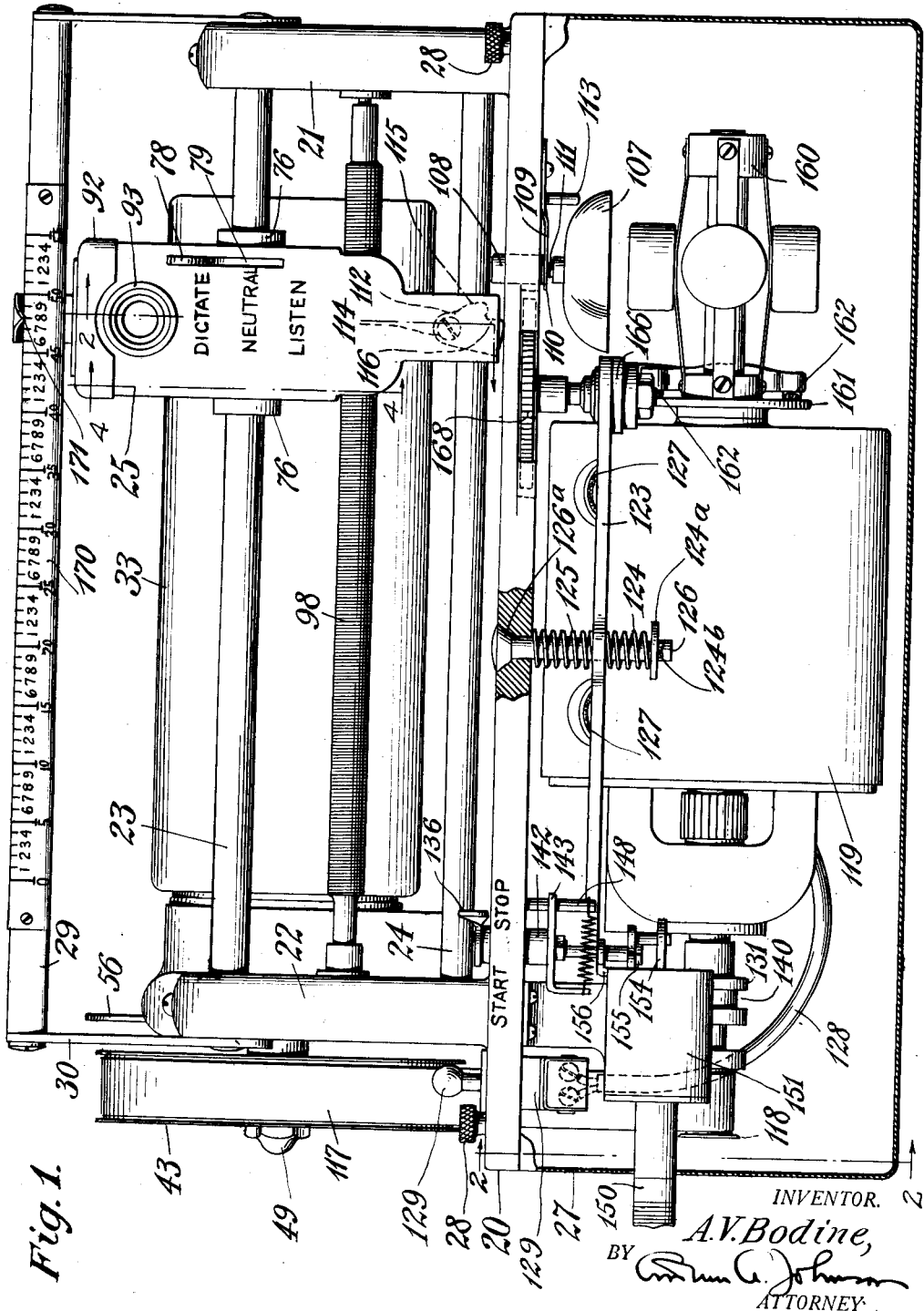

April 15, 1930.   A. V. BODINE   1,754,454
PHONOGRAPH STOP
Original Filed May 1, 1926   5 Sheets-Sheet 3

INVENTOR.
A. V. Bodine,
BY
ATTORNEY.

April 15, 1930. A. V. BODINE 1,754,454
PHONOGRAPH STOP
Original Filed May 1, 1926 5 Sheets-Sheet 4
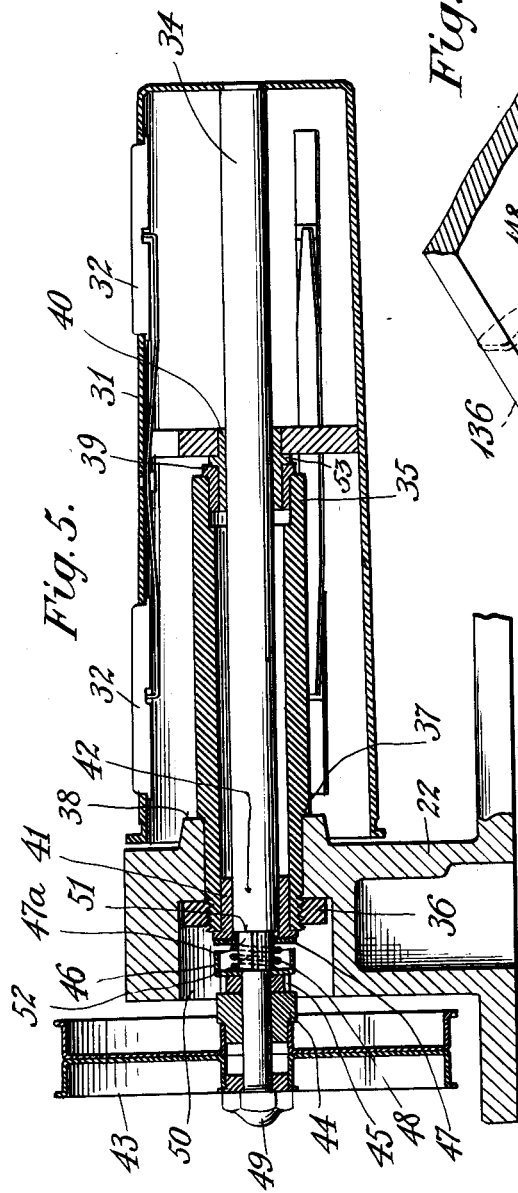
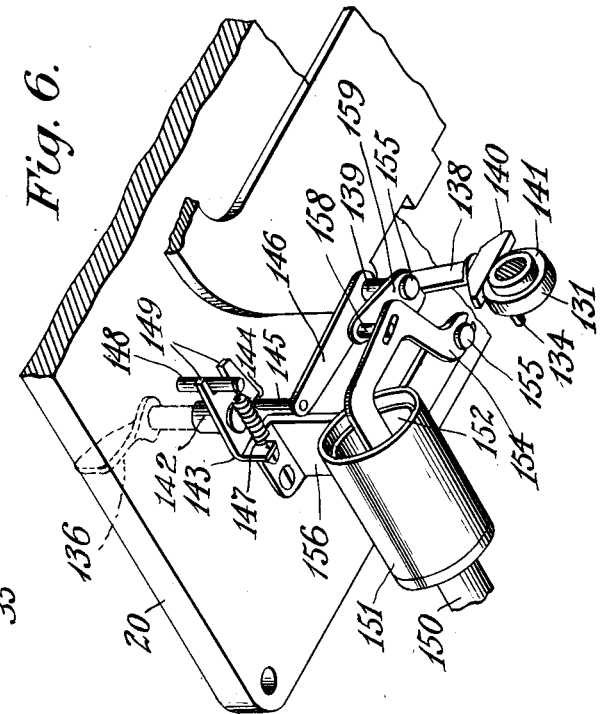
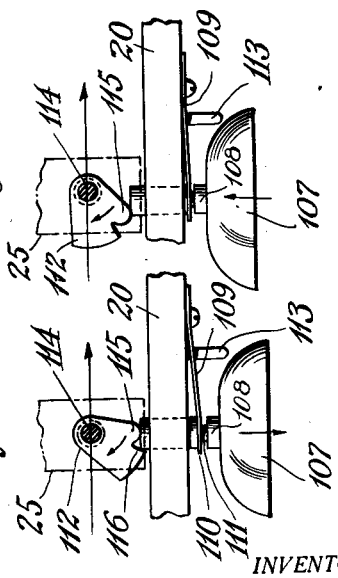
INVENTOR.
A. V. Bodine,
BY
ATTORNEY

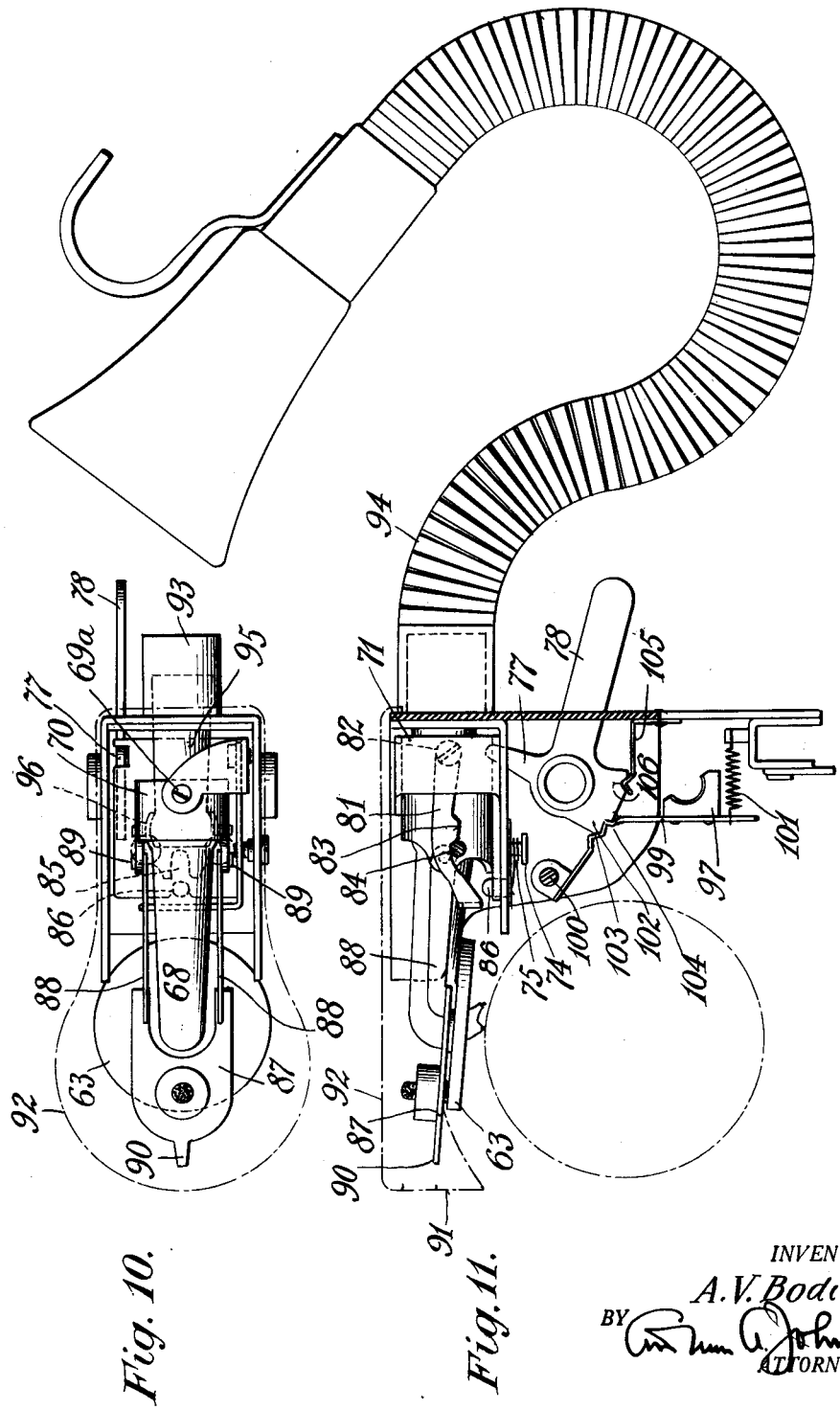

Patented Apr. 15, 1930

1,754,454

UNITED STATES PATENT OFFICE

ALFRED V. BODINE, OF BRIDGEPORT, CONNECTICUT, ASSIGNOR TO DICTAPHONE CORPORATION, OF BRIDGEPORT, CONNECTICUT, A CORPORATION OF NEW YORK

PHONOGRAPH STOP

Application filed May 1, 1926, Serial No. 105,989. Renewed September 7, 1929.

This invention relates to phonographs and more particularly to phonographs for recording and reproducing dictation.

An object of this invention is to provide a simple, small and light-weight dictation machine which can be economically manufactured and easily assembled.

Another object is to provide a phonograph in which most of the mechanisms are formed of sheet-metal or other easily manufactured parts.

Another object of the invention is to provide group assemblies so that various parts of the machine may be separately assembled and the assembled groups finally assembled into the whole machine.

Further objects are to provide improved sound-recording and reproducing means; improved start and stop means; improved speed control means; improved record-end alarm means comprising a minimum number of parts; and improved mandrel supporting means.

Other objects and advantages will hereinafter appear.

In the accompanying drawings—

Figure 1 is a front elevation of the machine showing the base in sections to reveal the mechanism which is contained therein.

Fig. 2 is a side sectional view of the machine taken on line 2—2 of Fig. 1.

Fig. 3 is a rear view of a portion of the machine showing the record ejecting mechanism.

Fig. 5 is a longitudinal section through the record mandrel and its support.

Fig. 6 is a perspective view of the clutch and its operating mechanism.

Fig. 7 is a detail view showing the bell trip-lever in the position preparatory to ringing the bell.

Fig. 8 is a view of the mechanism shown in Fig. 7, showing positions of the parts after the bell has been rung.

Fig. 9 is a side view showing the motor and its support.

Fig. 10 is a top plan view of the parts of the sound-box and sound-box carriage.

Fig. 11 is a side view of the parts shown in Fig. 10 taken on line 4—4 in Fig. 1 but showing in addition thereto, the sound-conveying or speaking tube.

The frame

Figure 4:
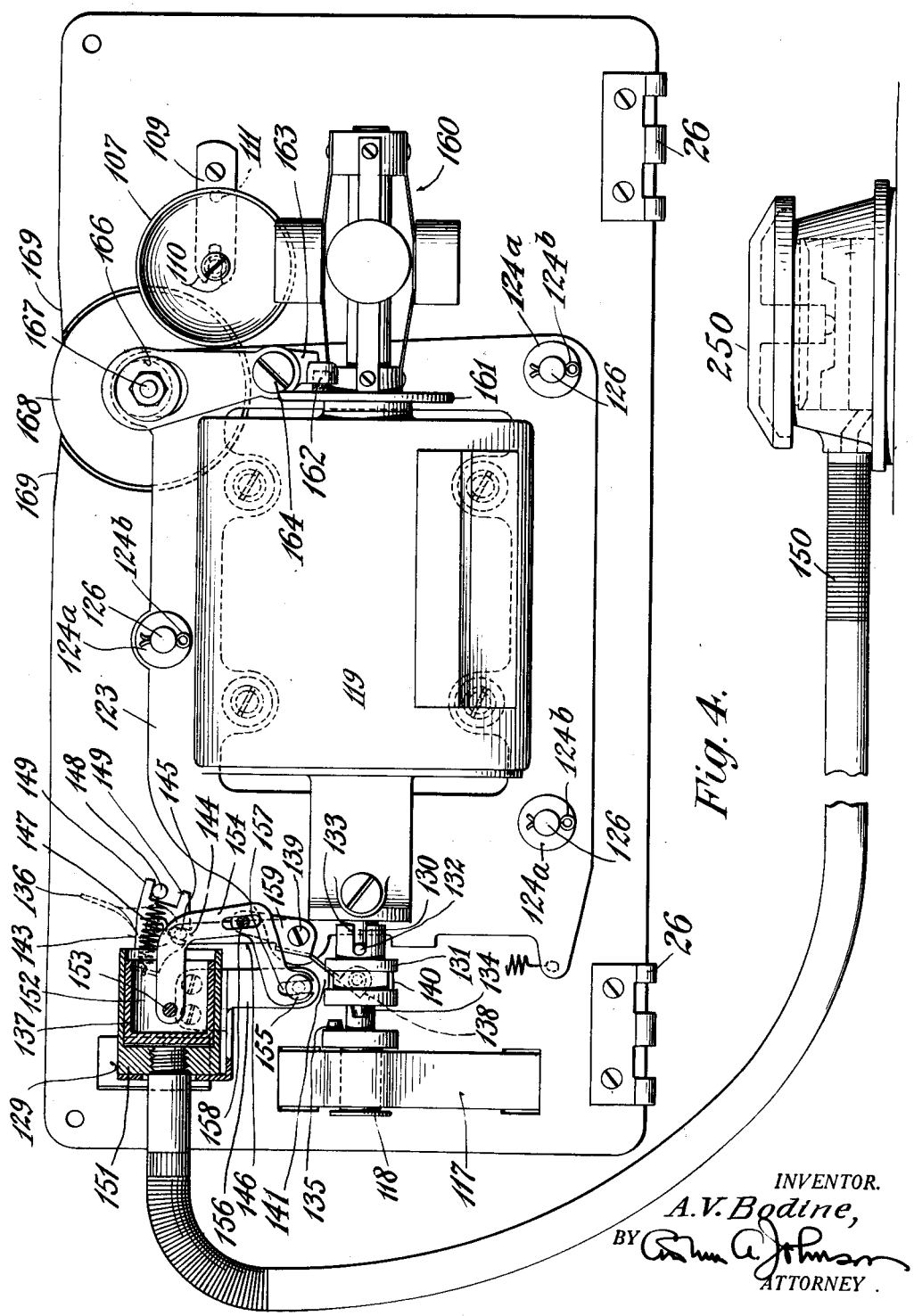
Fig. 4 is a view looking at the bottom of the cover plate, showing the parts mounted thereon.

The frame of the machine comprises a top-plate 20, preferably formed of aluminum or other light-weight material, having a right-hand standard 21 and a left-hand standard 22 between which there are mounted upper and lower guide rods 23 and 24 upon which a sound-box carriage 25 is slidably mounted. The top-plate 20 has hinges 26 connecting it to a box 27 upon which the top-plate 20 is supported, and which encloses and protects mechanism mounted on the underside of the top-plate. The top-plate is locked to the box by screws 28.

For the purpose of providing a convenient carrying handle for the machine, for the purpose of protecting the sound-box carriage and for another purpose hereinafter referred to, there is provided above the sound-box carriage a transverse bar 29 secured to arms 30 carried by standards 21 and 22 (see Figs. 1 and 2). The arms 30 may be formed integral with the standards 21 and 22 if desired, or, as shown, they may be made of separate sheet-metal stampings secured to the standards.

Record support

The machine is provided with a mandrel 31 having spring-pressed plungers 32 for supporting a record 33, so that the record may be rotated by the rotation of the mandrel to record or reproduce sound thereon. The mandrel 31 is provided with a shaft 34 mounted in a bearing tube 35 secured in the standard 22 by means of a key-nut 36 which draws a flange 37 on the bearing tube firmly against a flange portion 38 on the standard 22.

Heretofore, the tube 35 was formed integral with the standard 22, but while this construction was found to be expensive and annoying, no other satisfactory arrangement could be devised. However, the present invention overcomes all the disadvantages of having the tube 35 integral with the standard 22 and yet is just as satisfactory from a structural standpoint. Moreover, it is more economically made because all of the parts can be made by automatic screw machines.

At its inner end, the bearing tube 35 has secured thereto a bearing 39 in which rides a bearing 40 carried by the shaft 34. At its end adjacent the standard 22, the tube 35 has a bearing 41 riding on a bearing surface 42 on the shaft.

The outer end of the shaft 34 is provided with a driving pulley 43 preferably formed of two pieces made of stampings of sheet metal welded together, preferably by spot welding. Next to the driving pulley 43 is a washer 44. Then comes a gear 45 which operates the feed mechanism for the carriage 25 hereinafter described. After that, there is provided a cup-shaped washer 46 and between the cup-shaped washer and confined therein and a washer 47 engaging the bearing 41 is a spring 48. On the end of the shaft beyond the pulley 43 is a nut 49. All the parts on the shaft from the washer 44 to the key-nut 36 are located in a chamber 50 provided in the standard 22 where they will be entirely concealed and not take any extraneous space.

When the parts are assembled on the shaft as shown and the nut 49 is tightened, the pulley 43, washer 44, gear 45 and cup-shaped washer 46 are all tightened together and against a flange 51 on the shaft, so as to move with the shaft under all conditions. The washer 47 also moves with the shaft because it has a feather 47ª riding in a groove 52 in the shaft, but it also presses outwardly against the bearing 41 so as to draw the mandrel shaft and the assembled parts to the left, as seen in Fig. 5 until the flange 53 on the bearing 40 engages the bearing 39. Hence, all play or looseness is taken up by the spring 48 and yet the parts are free to move without excessive friction.

Record ejector

To facilitate the removal of the record 33 from the mandrel 31, the present invention provides an extremely simple record-ejector comprising a lever 54 pivoted on a screw 55 mounted in the standard 22 and having a finger-piece 56 bent therefrom and a record-engaging shoe 57 pivoted on a stud 58 secured in the lever 54, so that it may lie flat against the end of the record when engaging the same to free the record from the mandrel. When the record-ejector lever 54 is moved to the left as seen in Fig. 3, against the tension of a spring 59, the shoe 57 engages the end of the record 33 and moves the same sufficiently with regard to the mandrel to loosen it so that the record may be easily grasped by the fingers of the operator and removed without further difficulty. A stop-pin 60 is engaged first by the lever itself when it is in its normal position as shown in Fig. 3 and then by an arm 61 on the lever 54 when the lever is in its operated position.

It will thus be seen that the record-ejector provided by the present invention is extremely simple and comprises but two operating parts, both of which may be made of sheet metal, and thus economically.

Recording and reproducing mechanism

Sound is recorded upon or reproduced from the record 33 supported by the mandrel 31 by a sound-box 62 mounted in the carriage 25 which is slidably mounted on the guide-rods 23 and 24 carried by the standards 21 and 22.

The sound-box 62 comprises an inverted pan 63 having secured thereto by rubber gaskets and suitable adhesive, such as bees-wax, a diaphragm 64 carrying a stylus holder 65 in which there is mounted a recording stylus 66 and a reproducing stylus 67. The stylus holder 65 is mounted on the center of the diaphragm and is supported against side thrusts during rotation of the record (which will cause it to deform the shape of the diaphragm) by a stay-bar 66ª extending to the edge of the diaphragm where it is anchored by bees-wax or the like.

The pan 63 is secured to a supporting and sound-conveying tube 68 which is mounted in the carriage for free vertical movement so as to accommodate itself to records of different thicknesses and so as to rise and fall in following the irregularities and eccentricities of the record-surface. The pan 63 and tube 68 are also mounted for free lateral movement when reproducing, and have longitudinal movement for changing from sound-recording to sound-reproducing positions, the styli 66 and 67 being set one in front of the other and being brought into position to engage the record by the said longitudinal movement of the pan.

For these purposes, the tube 68 of the sound-box 62 is mounted on horizontally disposed trunnions 69 in a sleeve 70 which in turn is mounted on vertically disposed trunnions 69ª mounted in a slide 71 and an arm 72 formed integral with the slide. The slide 71 rides on a shelf 73 in the carriage-frame 25 and is held and guided thereon by a pair of studs 74 threaded in the slide and having washers engaging the under-side of the shelf by the pressure of springs 75 located between the heads of the washers and the heads of the studs.

For controlling the slide with the sound-box which it supports, there is pivotally mounted on a hollow stud 76 on one wall of the carriage-frame 25, an arm 77 formed integral with a lever 78 extending through a slot 79 in the carriage-frame. This arm 77 passes through an aperture in the shelf 73 and engages the walls of a slot 80 in the slide. The arrangement is such that when the lever 78 is in its raised position as seen in Fig. 2, the arm 77 has moved the slide 71 rearwardly so that the recording stylus 66 is in engagement with the record-surface. When the lever 78 is lowered to its lower-most position, the arm 77 moves the slide forwardly and causes the reproducing stylus 67 to be located in record-engaging position.

In order that the styli will not scratch the record-surface when the pan 63 is shifted laterally and in order that the pan and the styli may be held in inoperative position out of engagement with the record when the lever 78 is in an intermediate or neutral position, a pan controlling arm 81 is mounted on a pivot 82 on the slide 71 and this arm is provided with cam surfaces 83 adapted to engage a stationary abutment 84 mounted on the side wall of the carriage-frame. Hence, when the slide is moved in and out of the carriage-frame, the pan is raised from the record-surface, then moved longitudinally and then allowed to drop into record-engaging position as soon as the stylus to be used is in record-engaging position. Of course, when the lever 78 is in an intermediate position, the pan controlling arm 81 has the protruding portion of its cam in engagement with the abutment 84 and this holds the pan with the stylus off the record-surface.

While the lateral movement of the sound-box permitted by the trunnions 69a is desired and necessary for free tracking movement of the sound-box during sound-reproducing, it is undesirable to have this movement during recording, hence, the sleeve 70 is extended rearwardly and is provided with a longitudinal slot 85 into which a spring-pressed holding pin 86 extends when the sleeve 70 is moved rearwardly to bring the recording stylus into record-engaging position. When the pin 86 is located in the slot 85 of the sleeve, no appreciable lateral movement of the sound-box is permitted, and consequently a true helical groove is inscribed on the record by the rotation of the mandrel and the traveling movements of the carriage.

In the operation of reproducing sound, it is desirable to have a certain amount of downward pressure on the pan or sound-box to hold the reproducing stylus against the surface of the record. This is provided by a weight 87 having arms 88 movable on the horizontal pivots 89 carried by the sleeve 70. However, it is not desirable to have this weight on the sound-box or pan during recording operation, for in such case the recording stylus would cut too deeply. To relieve the sound-box or pan of the pressure of the weight 87 during recording operation, the weight is provided with a rearwardly extending finger 90 adapted to move upwardly into and drop upon a support 91, formed integral with a cover 92 for the sound-box and sound-box carriage, when the sound-box is moved rearwardly to bring the recording stylus into engagement with the record.

It will be seen that the construction provided can be made and assembled economically, for the slide and the parts mounted thereon constitute a complete unit which can be placed upon the shelf 73 in the carriage and can be secured thereto by the two simple screw studs 74.

For the purpose of providing a coupling between the supporting and conveying tube 68 of the pan and a nozzle 93 on the carriage to which a speaking tube 94 may be secured, there is provided a coupling tube 95 located within an enlarged end 96 of the conveying tube 68 and flaring outwardly until it snugly fits the inside wall of the nozzle 93 on which it slides during the reciprocatory movements of the slide 71 and tube 68.

The sound-box carriage shown can also be economically manufactured, for it consists of a sheet metal stamped and formed to shape, so as to have a front wall and two side walls for supporting the mechanism which it contains.

The sound-box carriage also supports a feed-nut 97 which is adapted to engage a feed-screw 98 journalled in the standards 21 and 22 of the frame of the machine. The feed-nut 97 is mounted in a frame 99 pivoted at 100 in the side walls of the carriage and provided with a spring 101 for normally urging the feed-nut towards the feed-screw. In order to release the feed-nut when the control lever 78 is shifted to neutral position so that the carriage may be moved to position to start a new record or to any other position with respect of the record-surface, the control lever 78 is provided with a lug or arm 102 adapted to engage cam surfaces 103 on the nut-frame 99 during the shifting of the lever to neutral position in which position the lever is frictionally detained by a dwell 104 into which the lug extends, and in this position the feed-nut is held out of engagement with the feed-screw. The arrangement is such between the lug 102 and the cam surfaces 103 that the arm 77 engaging the slide 71 moves the slide sufficiently to cause both styli to be off the record-surface before the feed-nut is withdrawn from engagement with the feed-screw. This arrangement prevents the carriage from being moved laterally by hand while either stylus is in engagement with the record surface.

It will be noted that the feed-nut 97 instead of being merely mounted on an arm is mounted on a broad plate or frame and this is done so that the plate will protect the feed-nut and feed-screw from dust or the shavings from the record and so as to close the back of the sound-box carriage 25 against tampering by curious persons.

It will be noted that the feed-nut frame 99 performs three functions—(1) to carry the feed-nut into and out of engagement with the feed-screw; (2) to keep the feed-screw and feed-nut clean; and (3) to serve as a detent for holding the control lever in neutral position.

The control lever is held in reproducing and recording positions against accidental movement by a spring detent 105 engaging dwells or notches 106 in an arcuate extension of the arm 102 on the control lever.

The simple operation of moving the lever 78 from recording to reproducing position causes the last few lines of recording to be reproduced without moving the carriage 25 backwardly. This is accomplished by offsetting, the reproducing stylus 67 longitudinally of the machine with respect of the recording stylus 66 and the extent of offset is sufficient to just reproduce the last portion of the matter recorded. Conversely, when the matter recorded has been reproduced and the operator desires to again record, the movement of the control lever 78 to recording position causes the recording stylus to engage the record in advance of the last groove recorded. Hence, there is no danger of the recording stylus re-engaging a groove which is already recorded and obliterating the matter recorded.

Record-end alarm

In order to warn the operator when the end of the record is being approached by the recording or reproducing stylus, the phonograph is provided with an alarm comprising a bell 107 located beneath the top-plate 20 of the machine and having a pin 108 extending upwardly through the top-plate of the machine. The bell is held in elevated position by means of a spring 109 having a forked-end 110 engaging a reduced portion 111 of the pin 108. Mounted on the carriage frame 25 is a trip-arm 112 adapted to engage and depress the pin 108 as the carriage approaches the end of its movement. This lowers the bell 107 against the tension of the spring 109 so that, when the pin 108 is released from the trip-arm 112, the pin and bell will be moved upwardly by the spring 109 until the bell strikes a pin 113 fixed to the under-side of the top-plate 20, vibrating the bell sufficient to produce a sound audible to the operator of the machine. The simplicity of this bell mechanism should be noted, for it comprises a very few parts, and to attach the same it is merely necessary to insert the pin 108 in the hole in the top-plate and cause the forked-spring 109 to engage in the reduced portion 111.

In allowing the bell to quickly move upwardly so as to ring, the present invention does not provide a sharp trip-off point which would pass over the pin 108 so that it might rise quickly but instead provides a trip-arm operating on the toggle principle. The trip-arm 112 is pivoted at 114 on the carriage-frame and has a projection 115 adapted to ride over and press down on the top of the pin 108 when a depending portion 116 of the arm 112 engages the left side of the pin 108 as seen in Fig. 1. Then, as the carriage continues to advance, the arm 112 depresses the pin 108 by the toggle action as shown in Fig. 7 until the pivot 114 of the arm moves beyond the center of the pin 108 when the toggle is automatically broken and the arm 112 quickly moves to the position shown in Fig. 8, thus allowing the bell 107 to jump-up and strike the pin 113.

Motor drive

The pulley 43 on the mandrel shaft is operated by a belt 117 engaging a pulley 118 on the motor 119, the belt being held taut by an idler roller 120 carried by an arm 121 pivoted at 122. The motor is supported on a sheet-metal saddle 123 which is suspended from the top-plate 20 at three points by lower and upper springs 124 and 125 respectively, carried by studs 126 hanging by the heads 126ª in the top-plate 20 (see Fig. 1), the motor 119 being insulated from the saddle 123 by insulations 127. Below the lower springs 124 there are washers 124ª and below them are cotter-pins 124ᵇ, which when removed from their holes in the studs 126, permit the motor and saddle to be removed from the top-plate 20.

The motor 119 is preferably wound for alternating direct-current so that it is substantially universal and can be used almost anywhere on commercial power-lines.

The cable 128 leading to the motor has in series with it a switch 129 by means of which the motor may be stopped and started.

Stop and start mechanism

The shaft 130 of the motor is not directly connected to the pulley 118 but drives the pulley through clutch mechanism comprising a grooved collar 131 connected to slide on but rotate with the shaft by a pin 132 on the shaft riding in a slot 133 in the collar. The collar 131 has at its forward end a pin 134 adapted to contact with a pin 135 on the pulley 118 when the collar 131 is shifted to bring the pin 134 into path of the pin 135. The pins 134 and 135 are tapered off as shown in Fig. 4 to permit the quick and easy separation of the pins when the collar 131 is shifted to the right as seen in Fig. 4.

The clutch collar 131 is shifted either by hand by means of a lever 136 or by a pneumatically operated device 137, both of these parts being connected to operate a shifter 138 pivoted on a stud 139 on the saddle 123 and having a block of fibre or other suitable insulating material 140 located in the groove 141 of the collar 131. For operating the shifter 138 by hand, the finger-piece 136 has secured to it a short shaft 142 extending through the top-plate 20 where it is provided with an arm 143 having a slot 144 to engage a pin 145 on an arm 146 of the shifter 138. When the finger-piece 136 is moved it operates the shifter 138 to move the collar 131 to either clutched or unclutched position. The finger-piece 136 is held in either clutching or unclutching position by means of a spring 147 carried by the arm 143 and located on a pin 148 in the top-plate 20. This spring is so arranged that when the arm 143 is rocked to either limit of its movement as controlled by the stop fingers 149 engaging the pin 148, the spring 147 is thrown to either one side or the other of the center of the shaft 142 and when so thrown holds the finger-piece 136 with its arm 143 in that adjusted position. For operating the clutch mechanism by power, which can be operated from a point remote from the machine, by a hand or foot operated device 250 which forces air through a flexible tube 150, there is provided a cylinder 151 containing a piston 152 having a wrist-pin 153 for connecting it to an arm 154 extending to and guided in its movement by a pin 155 mounted in a bracket 156 and located in a slot 157 in the arm 154. The power supplied by the piston 152 is taken from the lever 154 by a pin 158 carried by an arm 159 formed integral with the shifter 138. Hence, when the piston moves outwardly from the cylinder, the shifter rocks clockwise as seen in Fig. 4 to move the clutch collar 131 to bring the pin 134 into engagement with the pin 135 on the pulley. Conversely, the production of a partial vacuum in the tube 150 by the return movement of the part 250 causes the piston 152 to be again drawn into the cylinder and the clutch collar 131 to be moved to the right in Fig. 4 out of engagement with the pulley.

The connections between the shifter 138 which is mounted on the movable saddle 123 and the levers 154 and 143 which operates the shifter 138 are pin-and-slot connections so as to permit vertical movements of the motor saddle due to its spring suspension as above described and so that the vibrations of the motor will not be transmitted to the top-plate 20 through these connections.

While the clutch and the cylinder and piston are located in the box 27 and are thus not visible, the condition of the clutch is indicated to the operator by the lever 136 acting as a pointer in connection with the words stop-and-start which are lettered in the frame, as shown in Fig. 1.

Speed control mechanism

The speed of the motor is kept substantially constant during the operation of the machine by means of a speed-governor 160 comprising a brake disk 161 engaged by brake shoes 162.

In order that the speed of the motor may be varied according to requirements, the brake shoes 162 are carried by a lever 163 pivoted at 164 on the saddle 123 and having its other end operated by an eccentric 166 on a shaft 167 also mounted in the saddle 123. At its upper end the shaft terminates adjacent the top-plate 20 and there in a counter-sunk chamber is located a finger-piece or wheel 168 by means of which the shaft 167 is rocked to shift the lever 163 carrying the brake shoes 162. It will be noted that the wheel 168 protrudes beyond the front of the box 27 and that the front edge of the top-plate 20 is cut away at 169 so that the wheel 168 may be operated without raising the top-plate from the box and yet without protruding through the top-plate. It should be noted that the wheel 168 on the shaft 167 does not come in contact with the top-plate and this spacing is provided so that the vibrations of the motor will not be communicated to the top-plate, or any other structural part of the machine.

By rotating the finger-wheel 168, the brake shoes 162 are moved toward or from the brake disk 161 to cause the motor to decrease or increase in speed respectively.

Scale

As above stated, the bar 29 has another function not previously described and that is to support a scale bar 170, as disclosed and claimed in Patent No. 1,638,558, granted to C. K. Woodbridge, August 9, 1927, which co-operates with a pointer 171 carried by the cover 92 of the carriage frame. By means of this scale bar and pointer, the operator may indicate on a piece of paper what part of the record certain correspondence or other matter has been recorded and where corrections and special work is to be done, for the benefit of the operator who is to transcribe the record.

While the main object of the present invention is to provide a small compact dictation machine with several novel features of construction which have herein been described in detail, claims for the record-end alarm and the sound-box structure are not contained in this application, but are presented respectively in my co-pending applications, Serial No. 193,256, filed May 21, 1927, and Serial No. 186,955, filed April 27, 1927, both divisions of this application.

Variations and modifications may be made within the scope of this invention and portions of the improvements may be used without others.

Having now described the invention, what is claimed as new and for which it is desired to obtain Letters Patent, is:—

1. A phonograph comprising a frame; a motor; mechanism mounted on the frame; a saddle for carrying the motor; and a stop-and-start device for said mechanism comprising a clutch carried by the motor, and a clutch shifter carried by the saddle.

2. A phonograph comprising a frame; a motor; mechanism mounted on the frame driven by the motor; a saddle resiliently mounted on the frame and movable relatively thereto; a clutch carried by the motor for connecting the motor to the mechanism which it drives; a clutch shifter mounted on the saddle; operating means for the clutch mounted on the frame; and flexible connections between the clutch shifter and said operating means to permit movement of the resiliently mounted saddle to prevent the transmission of vibration from the saddle to the frame.

3. A phonograph comprising a frame; mechanism mounted on the frame; and a power unit mounted on the frame adapted to operate said mechanism, said power unit comprising a supporting plate or saddle; a motor mounted on the saddle; speed controlling means including a manually-engaged adjusting part mounted on the saddle, and a manually-operable clutch supported on the saddle, said saddle with the parts which it supports being adapted to be assembled as a unit away from the frame to be subsequently attached to the frame.

4. In a phonograph, the combination of a frame; mechanism mounted on the frame; a motor having a driving shaft for operating said mechanism; a pulley loosely mounted on the motor shaft and in driving connection with said mechanism; a clutch element on said pulley; and a clutch element keyed to the motor shaft and adapted to be brought into cooperation with the clutch element on the pulley.

5. In a phonograph, the combination of a main frame; mechanism mounted on the frame; a motor having a driving shaft for operating said mechanism; a clutch on said motor shaft forming a driving connection between the motor shaft and said mechanism; a motor frame for supporting said motor on the main frame in movable relation thereto; and clutch engaging and shifting mechanism mounted on the motor frame to move therewith.

6. In a phonograph, the combination of a main frame; mechanism mounted on the frame; a motor having a driving shaft for operating said mechanism; a clutch on said motor shaft forming a driving connection between the motor shaft and said mechanism; a motor frame for supporting said motor on the main frame in movable relation thereto; clutch engaging and shifting mechanism mounted on the motor frame to move therewith; clutch operating means mounted on the main frame; and connecting means between the clutch operating means on the main frame and the clutch shifting means on the motor frame permitting movement of the latter relative to the former.

7. In a phonograph, the combination of driving means comprising a motor; a clutch comprising a movable member; a manually operable clutch controlling lever; a clutch shifter for controlling said movable clutch member and having a pin-and-slot connection with said manually operable lever; and an automatically operated lever having a pin-and-slot connection with said clutch shifter.

8. In a phonograph, the combination of driving means comprising a motor; a clutch comprising a movable member; a manually operable clutch controlling lever; a clutch shifter for controlling said movable clutch member and having a pin-and-slot connection with said manually operable lever; an automatically operated lever having a pin-and-slot connection with said clutch shifter; and a detent spring connected to said manually operable lever to hold the clutch shifter in either clutching or unclutching position both when moved to those positions manually and automatically.

9. In a phonograph, the combination of driving means comprising a motor; a clutch comprising a movable member; a manually operable clutch controlling lever; a clutch shifter adapted to control said movable clutch member and having a pin-and-slot connection with said manually operable lever; and a detent spring connected to said manually operable lever adapted to hold the clutch shifter in either clutching or unclutching positions.

10. In a phonograph, the combination of driving means comprising a motor; a clutch comprising a movable member; a clutch shifter for controlling said movable clutch member; an automatically operated lever having a pin-and-slot connection with said clutch shifter; and means for holding the clutch shifter in either clutching or unclutching positions.

11. In a phonograph, the combination of driving means comprising a motor; a clutch comprising a movable member; a clutch shifter for controlling said movable clutch member; a box for supporting and containing said motor, clutch and clutch shifter; means for operating the clutch also mounted in and concealed by the box; and means extending into visible position and operated by said clutch shifter for indicating whether the clutch is in clutching or unclutching position.

12. In a phonograph, the combination of driving means comprising a motor; a clutch comprising a movable member; a clutch shifter for controlling the movable clutch member; a pneumatic for actuating said clutch shifter; and a snap-connection for completing the movement of the clutch shifter to and holding the same in clutching or unclutching position.

Signed at Bridgeport, in the county of Fairfield and State of Connecticut, this 29th day of April, 1926.

ALFRED V. BODINE.